MULTISTAGE RING CIRCUIT

Filed Sept. 1, 1948 2 Sheets-Sheet 1

INVENTOR
J. O. EDSON
BY George C. Ford
ATTORNEY

Feb. 20, 1951 J. O. EDSON 2,542,644

MULTISTAGE RING CIRCUIT

Filed Sept. 1, 1948 2 Sheets-Sheet 2

INVENTOR
J. O. EDSON
BY George C. Lord
ATTORNEY

Patented Feb. 20, 1951 2,542,644

UNITED STATES PATENT OFFICE 2,542,644

MULTISTAGE RING CIRCUIT

James O. Edson, Warren Township, Somerset County, N. J., assignor to Bell Telephone Laboratories, Incorporated, New York, N. Y., a corporation of New York Application September 1, 1948, Serial No. 47,179

11 Claims. (Cl. 250—27)

This invention relates to ring or ring counter circuits and more particularly to circuits of this type having a large number of single tube stages.

Ring circuits belong to the general class of circuits which comprise a plurality of stages each capable of two different operating conditions inter-connected in such a way that a conductive condition can be stepped from stage to stage in response to a series of input pulses. When a plurality of such stages are arranged in tandem, the resulting circuit is often known as a chain circuit. When the final stage of a chain circuit is connected back to the first stage, a ring circuit is obtained. In a chain circuit, sometimes called an open ring circuit, the conductive condition may be stepped along the chain to the end thereof after which the circuit must be reset for further operation, while in a ring circuit the condition of conduction may be stepped from stage to stage around the ring indefinitely.

Ring circuits particularly are suited for use in many applications including, for example, their use in frequency dividers, distributors, gate generators and counters. In a particular application, as the gate generator for a time division multiplex system, for example, a ring circuit having one stage for each message channel to be multiplexed may be employed. As the conductive condition is stepped to each stage in turn, the change in operating condition of that stage may be used to connect a corresponding message channel to common transmission facilities. Thus as the ring stages are recurrently actuated, samples of the several messages are recurrently applied to the transmission channel.

Perhaps the earliest ring circuits employed gas-filled tubes of the type commonly known as a thyratron wherein the necessary two operating conditions were provided by the non-conducting and the conducting conditions of the tube. The time required for deionization in such gas tubes after they have fired places a serious limitation upon the operating speed of ring circuits in which they are employed.

Another type of circuit which overcomes this difficulty is the well-known Eccles-Jordon trigger circuit which includes vacuum tubes and is capable of much greater operating speeds. In rings employing such circuits as component stages however undesirably large numbers of tubes are required.

More recently a third type of ring circuit has been constructed employing only one vacuum tube per stage. In this type of circuit as described in "Electrical Counting" by W. B. Lewis, Cambridge 1942 at page 19 or in Electronics Magazine, March 1948 at page 124, the anode of each tube is connected through a resistor to the control grid of each other tube. A forward coupling circuit is provided between the anode of each tube and the control grid of the succeeding tube and a second coupling circuit is provided between the anode of each tube and the control grid of the preceding tube, these last two coupling circuits being capacitive to provide an alternating current path between stages. Such ring circuits depend for their operation upon the fact that when the tubes are so interconnected only one tube at a time may receive such a bias voltage on its control grid as to permit the flow of current therethrough. It will be apparent, therefore, that the successful operation of the ring circuit is a matter of providing sufficiently stable circuit components and adequate operating tolerances to permit distinction between two levels of grid voltage for each tube. This has been accomplished for ring or chain circuits having up to four or five stages but it has been found that when additional stages are added the difference between the two bias conditions representing respectively the two operating conditions for any stage becomes so small that it is impossible to provide reliable operation.

It is the object of the present invention to provide ring or chain circuits having a large number of stages wherein each stage may comprise a single tube or amplifying element.

In accordance with the invention a plurality of open ring or chain circuits each having a relatively small number of single tube stages are interconnected to form a chain or ring having as many stages as desired. For this purpose each of the component chain circuits has a lock-out stage associated therewith and the several lock-out stages are themselves connected in a ring circuit whereby after the condition of conduction has been transferred from stage to stage along one chain circuit it may be transferred from the last stage of that chain circuit to the first stage of a similar circuit.

The above and other features of the invention will be described in detail in the following specification taken in connection with the drawings in which.

Figure 1:
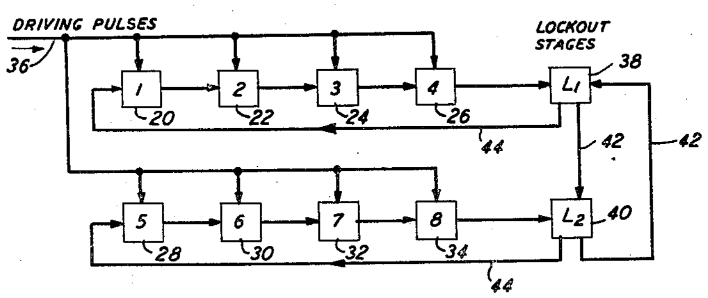
Fig. 1 is a block diagram showing one embodiment of the invention wherein two four-stage chain circuits are combined to form an eight-stage ring circuit.

Before considering in detail the manner in which single tube stages may be interconnected to produce an open ring or chain circuit, it will be helpful to consider the manner in which such chain circuits may be interconnected to form multistage ring circuits in accordance with the invention. In Fig. 1, for example, two four-stage chains or open rings are shown. The first of these includes single tube stages 20, 22, 24 and 26 while the second includes stages 28, 30, 32 and 34. It will be noted that in each chain a connection is indicated between each stage and the succeeding stage and that driving pulses are indicated as being applied over lead 36 to all of the stages in parallel. These interconnections are such that if the first stage 20 of the first open ring is initially conducting while the remaining stages are non-conducting, the application of the first driving pulse will cause the first stage to become non-conductive and the interstage connection serves to transfer the condition of conduction to the second stage, a second driving pulse will transfer the condition to the third stage, etc. In a similar fashion the condition of conduction may be transferred between adjacent stages 28, 30, 32 and 34 of the second chain circuit. In order to permit interconnection of these two chains to form a single multistage ring, lock-out stages 38 and 40 are associated with the first and second chains, respectively. Each of lock-out stages 38 and 40 receives an input pulse causing it to assume a condition of conduction at the time the condition of conduction passes from the final stage of the chain with which it is associated. Each has an output 42 which is connected to an input of the other and each has an output 44 which is connected to the input of the first stage of the chain with which it is associated. Each of the lock-out stages 38 and 40 is so arranged that when the stage is in receipt of an input from the final stage of the chain with which it is associated, an output pulse is produced on output 42 but none of significance is produced on output 44. Further, the lock-out stages are so arranged that when one is in receipt of a pulse from the output 42 of the other stage it will produce an output pulse in output 44 but not in output 42. In the case of the circuit shown in block form in Fig. 1 these conditions are met by a double-stability circuit of the type sometimes called a flip-flop circuit.

The operation of the ring circuit of Fig. 1 may now be considered. Let it be assumed that initially only stage 20 is conducting and that through the application of the driving pulses over lead 36 the condition of conduction is transferred from stage to stage until a pulse is applied from the final stage 26 of the first chain to lock-out stage 38. This pulse is effective to cause lock-out stage 38 to conduct and produce an output on lead 42 which upon reaching lock-out stage 40 causes it to become non-conductive and to produce a pulse on output lead 44. This latter pulse is applied to the first stage 28 of the second chain at substantially the same time as a driving pulse from lead 36 and causes this stage to assume the condition of conduction. The condition of conduction is then stepped along the second chain until it reaches the final stage 34. The next driving pulse from lead 36 causes stage 34 to become non-conductive at which time a pulse is applied to lock-out stage 40. This pulse is effective to cause lock-out stage 40 to produce an output on lead 42 which in turn causes lock-out stage 38 to produce an output on lead 44 and restore the first stage 20 to the condition of conduction which it was initially assumed to occupy.

Figure 2:
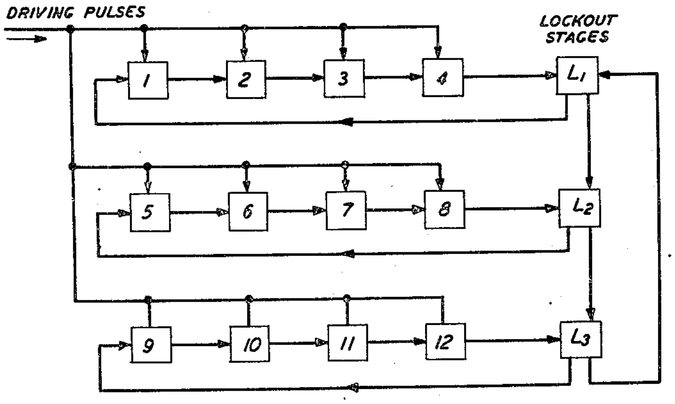
Fig. 2 is a block diagram showing the manner in which three four-stage open ring or chain circuits may be interconnected to form a single multistage ring circuit.

The twelve-stage ring shown in block form in Fig. 2 is based upon the same principles as the ring just considered above and the only differences are found in the nature of the interconnections between the lock-out stages associated with the several chain circuits. In the system of Fig. 1 which represents a special case, the two lock-out stages were interconnected in a flip-flop circuit. In the more general arrangement of Fig. 2 the interconnections between the lock-out stages are such that the lock-out stages themselves form a ring circuit wherein a particular condition of conduction may be transferred cyclically from stage to stage upon receipt of suitable driving pulses from the chain circuits with which they are respectively associated.

Figure 3:
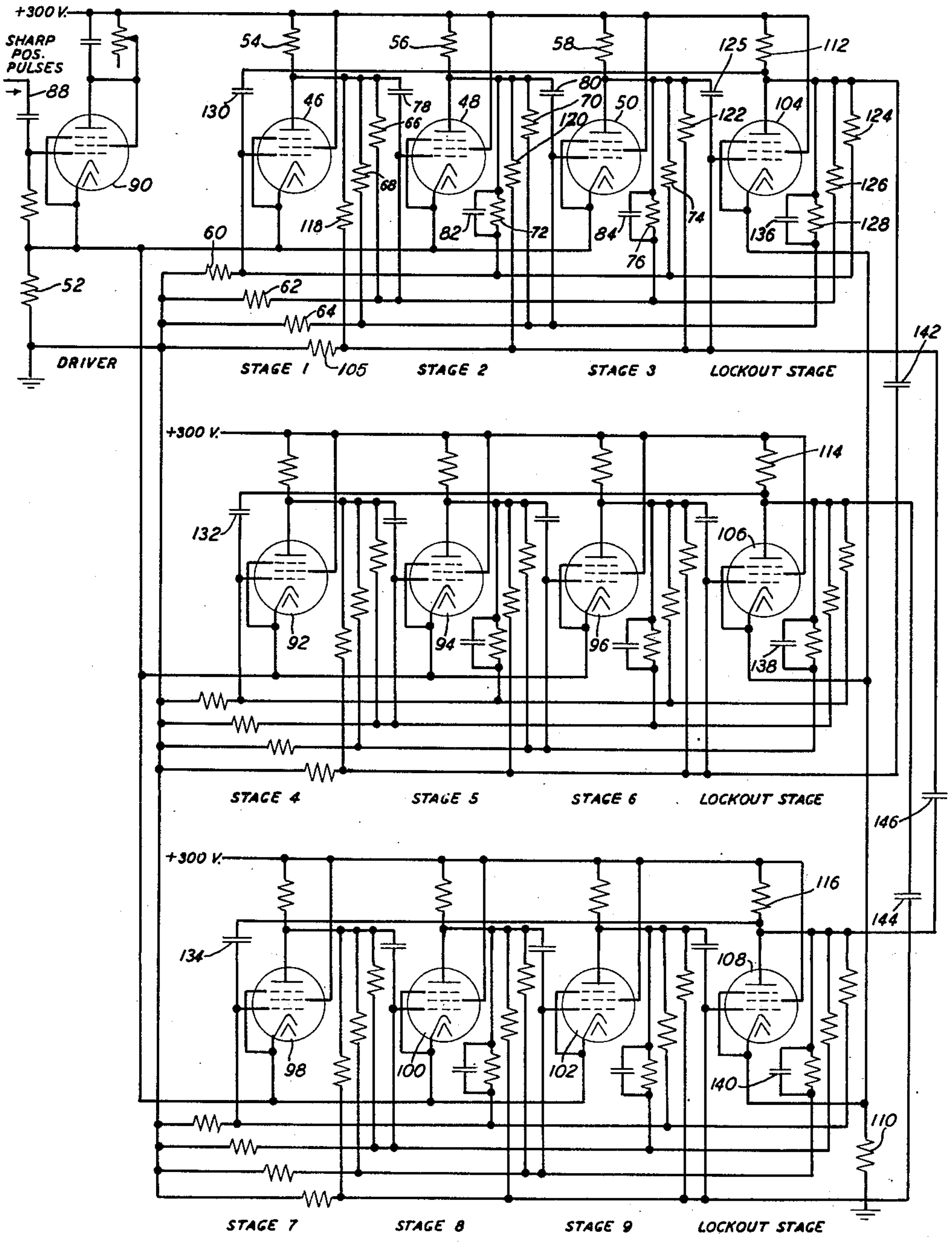
Fig. 3 is a detailed circuit schematic diagram of a nine-stage ring circuit in accordance with the invention.

The interconnections between the stages of the individual chains forming the ring circuits of Figs. 1 and 2 and the nature of a typical circuit including a lock-out ring may be considered in detail in connection with the schematic circuit diagram of Fig. 3, which shows in detail a nine-stage ring circuit made up three open ring or chain circuits each of which comprises three single tube stages.

The first chain circuit, comprising stages 1, 2 and 3 of the ring, will be considered first as a unit without regard to the connections between this circuit and certain of the other component circuits of the ring. Stages 1, 2 and 3 of the three-stage chain circuit conveniently comprise single pentode-type vacuum tubes 46, 48 and 50, respectively, although other types of tubes or amplifying elements may also be employed. The cathodes of these tubes are connected together and through a common cathode resistor 52 to ground and the suppressor grids are connected to the cathodes in the usual manner. The anodes of these three tubes are connected through anode resistors 54, 56 and 58, respectively, to a source of positive potential indicated at +300, while the screen grid of each tube is connected directly to this source of positive potential. The grids of tubes 46, 48 and 50 are connected to ground through grid return resistors 60, 62 and 64, respectively.

The anode of tube 46 is connected through resistors 66 and 68, respectively, to the control grids of tubes 48 and 50. The anode of tube 48 is connected through resistors 70 and 72, respectively, to the control grids of tubes 50 and 46 and the anode of tube 50 is connected through resistors 74 and 76, respectively, to the control grids of tubes 46 and 48. In addition to these connections the anode of tube 46 is connected through a capacitor 78 to the control grid of tube 48. The anode of tube 48 is connected through capacitors 80 and 82, respectively, to the control grids of tubes 50 and 46 and the anode of tube 50 is connected through capacitor 84 to the control grid of tube 48. In these inter-tube connections, the forward coupling capacitors 78 and 80 offer greater capacitances than the backward coupling capacitors 82 and 84 to insure that the conditions of conduction will be stepped along the chain in the direction of increasing stage number. Other interconnections between the tubes of this chain and other tubes of the complete circuit need not be considered at this time.

From the above, it will be seen that the control grid of each of tubes 46, 48 and 50 is held at a direct current potential which is made up of contributions from the anodes of the other two tubes. It will be recalled that the cathodes of the three tubes are interconnected and share a common cathode resistor 52. The values of the several resistors are so chosen in conjunction with the applied potentials that current may flow through only one of these three tubes at a time. Let it be assumed, for example, that current is flowing through tube 46 of stage 1. The potentials applied to the control grids of tubes 48 and 50 are in each case made up of two components, one of relatively high potential from the anode of non-conducting tube 48 or 50, as the case may be, and the other a relatively low potential from the anode of conducting tube 46. The potential applied to the control grid of tube 46 on the other hand is made up of two components of relatively high potential from the anodes of non-conducting tubes 48 and 50. Since the cathodes are all maintained at the same potential by virtue of the common cathode resistor 52, it will be recognized that this cathode potential may be adjusted in such a way that only the control grid of one tube, here tube 46, is at a sufficiently high potential in relation to the cathode to permit the flow of current through the tube.

The operating condition represented by the flow of current through a single tube is transferred along the chain through the application of positive pulses to all of the cathodes in parallel. Such pulses may be considered as applied over lead 88 through a cathode follower driver stage comprising pentode-type tube 90. Thus, positive pulses are applied in parallel to the cathodes of tubes 46, 48 and 50 and the duration of these pulses is made short in relation to the interval between them, this latter interval being the time during which any single stage of the chain retains its condition of conduction.

Assuming that the first stage is conducting as above, the application of a positive pulse lowers the grid-cathode potential of tube 46 sufficiently to interrupt the flow of current therethrough. Accordingly, the anode potential of this tube rises sharply producing a positive transient which is applied through a coupling circuit comprising capacitor 78 shunted by resistor 66 to the control grid of tube 48 of the second stage. The time constant of the RC coupling circuit is sufficient to allow the positive pulse applied to the cathodes of the tubes to pass away before the positive transient applied to the control grid of tube 48 falls appreciably in value. On the other hand the time constant of the "resistive" connections to the grids of each of the other tubes resulting from the fact that the grid leak resistor is in each case by-passed to ground by the interelectrode capacitance of the tube is enough greater than that of the "alternating-current" coupling circuit to permit transfer of the condition of conduction from one stage to the succeeding stage before the grid voltages of the remaining tubes in the chain reach the equilibrium value. Accordingly the grid-cathode potential of tube 48 is made sufficiently large to cause the initiation of current flow therethrough. As a result the anode potential of this tube falls and the negative transient so produced is applied through capacitor 82 to the control grid of tube 46 in the preceding stage to assist in cutting off the flow of current in that stage. Similarly, upon application of the second positive driving pulse the condition of conduction is switched from tube 48 to tube 50.

It should be noted that although numerous interstage connections other than those involved in this transfer extend between the stages of the chain, such interconnections have such high losses that they do not interfere with the operation of transferring the condition of conduction from stage to stage.

The remaining three-stage chains comprise vacuum tubes 92, 94 and 96 and vacuum tubes 98, 100 and 102, the interconnections between the three tubes of each chain being identical with those just considered above. It will be noted that the cathodes of all of these stages are connected together and share cathode resistor 52 in common with tubes 46, 48 and 50 of the first chain.

The lock-out circuits by means of which the condition of conduction is transferred from the final stage of one chain to the first stage of another may now be considered. It is to be noted first, however, that because of the use of cathode resistor 52 by all of the stages in common, current may flow in only one of the nine chain-circuit stages at a time. Thus, if as assumed in connection with the first chain described above, current initially is flowing in tube 46, then the tubes of all of the remaining stages are cut off.

The lock-out circuit includes single pentode-type tubes 104, 106, 108 associated respectively with the three chain circuits. These three lock-out tubes share a common cathode resistor 110 and the anodes of these tubes are connected through resistors 112, 114 and 116, respectively, to a source of positive potential. The details of the interconnections between lock-out tube stage 104 and the first chain circuit comprising stages 1, 2 and 3 may now be considered. Connections between tubes 46, 48 and 50 of the chain and lock-out tube 104 are similar to those between tubes 46, 48 and 50. Thus, the anodes of tubes 46, 48 and 50 are connected through resistors 118, 120 and 122, respectively, to the control grid of lock-out tube 104 while the anode of lock-out tube 104 is connected through resistors 124, 126 and 128 respectively, to the control grids of tubes 46, 48 and 50. Similar connections are made between lock-out tubes 106 and 108 and the individual tubes of the chain circuits with which they are associated. The values of the several resistors and of the common cathode resistor 110 are so chosen that the cathodes of the three lock-out tubes are normally at the same potential as the cathodes of the tubes in the nine ring stages. Thus, it will be recognized that when any stage of the first chain, for example tube 46, is passing current, lock-out tube 104 may be adjusted to be cut off in the same manner as tubes 48 and 50 are cut off under these conditions. Similarly, since none of the stages 4 through 9 may be conducting at this time, the grids of lock-out tubes 106 and 108 are at sufficiently high potentials to allow conduction through these tubes. Thus, in the initial condition in which the tube of stage 1 is conducting, lock-out tube 104 is cut off and lock-out tubes 106 and 108 are conducting.

ItI is now necessary to consider the alternating-current connections between the lock-out tubes and the chains with which they are associated and the connections between the several lock-out tubes. Thus, the anodes of lock-out tubes 104, 106 and 108 are connected through capacitors 130, 132 and 134, respectively, to the control grids of tubes 46, 92 and 98 in first stages of the chains with which the several lock-out tubes are associated. These capacitors have a function and capacitance similar to the coupling capacitors 78 and 80. Further, the anodes of lock-out tubes 104, 106 and 108 are connected through capacitors 136, 138 and 140, respectively, to the control grids of tubes 50, 96 and 102, these being the final stages of the chain circuits with which the lock-out stages are respectively associated. These capacitors are similar in function and capacitance to coupling capacitors 82 and 84. In addition, the anode of tube 104 is connected through capacitor 142 to the control grid of tube 106, the anode of tube 106 is connected through capacitor 144 to the control grid of tube 108, and the anode of tube 108 is connected through a capacitor 146 to the control grid of tube 104.

The operation of the nine-stage ring as a whole may now be considered. If, as above, it is assumed that stage 1 occupies the condition of stability in which current flows, the application of successive positive pulses over lead 88 will cause the condition of conduction to step stage by stage through the first chain until it reaches stage 3. When tube 50 comprising stage 3 becomes conductive the anode potential thereof drops sharply and a negative transient is applied through capacitor 125 to the control grid of lock-out tube 104. The negative transient is of no effect since this tube is already cut off at this time, as explained previously. Upon the application of the next positive driving pulse to the cathodes of the nine-ring tubes, however, the grid-cathode potential of tube 50 is reduced by an amount sufficient to interrupt the flow of current through this tube. Accordingly, a positive-going voltage is produced in the anode circuit and this, when applied to the control grid of lock-out tube 104, is of sufficient amplitude to drive that tube into conduction, switching the condition of conduction to this tube in the same manner as the condition is switched between any other pair of tubes of the chain. As soon as current flow is initiated in lock-out tube 104, its anode potential drops and the resulting negative transient applied through coupling capacitor 136 to the control grid of tube 50 aids in holding this tube in a non-conducting condition. In addition, the negative transient applied through coupling capacitor 142 to the control grid of lock-out tube 106, associated with the second chain circuit, lowers the grid potential of that tube with respect to ground. At the same time the increased flow of current through common cathode resistor 110 tends to raise the cathode potential of that tube with respect to ground. As a result, current flowing through lock-out tube 106 is interrupted and the tubes of the lock-out ring reach a condition of stability wherein tube 106 is cut off and tubes 104 and 108 are conducting current.

When current flow through lock-out tube 106 is interrupted as the consequence of the application of the third driving pulse to the ring circuit, the resulting positive transient in the anode circuit is applied through coupling capacitor 132 to the control grid of tube 92 which comprises the fourth stage of the ring. The application of the third driving pulse is thus effective to transfer the condition of conduction from the third stage of the ring to the fourth stage thereof, this transfer, in effect, amounting to the transfer of the condition of conduction from the final stage of the first open ring or chain circuit to the first stage of the second chain circuit.

The application of subsequent positive driving pulses to the ring results in the transfer of the condition of conduction along the second chain to stages 5 and 6 in succession. Then the sixth pulse is effective to initiate the flow of current in lock-out tube 106 and, by virtue of the connections between the three lock-out tubes, to cut off the flow of current in lock-out tube 108 thereby to transfer the conducting condition from the final stage 6 of the second chain to the first stage 7 of the third chain. The transfer from the final stage 9 of the third chain back to the first stage of the first chain is accomplished by the ninth driving pulse in exactly the same way.

From the above it will be recognized that in response to each driving pulse the condition of conduction is transferred from stage to stage of the complete ring and that, the cycle above having once been established, the ring may be operated continuously to produce 9 series of gate pulses displaced relative to each other by the interval between driving pulses and the pulses of each series recurring at a rate which is none-ninth the repetition rate of the driving pulses.

The following circuit constants are typical of those which may be employed in a multistage ring circuit according to the invention as shown in Fig. 3.

| | | |
|---|---|---|
| Tubes **46, 48, 50, 104, 92, 94, 96, 106, 98, 100, 102, 108** and **90** | type | 6AK6 |
| Resistors **54, 56, 58, 112** | ohms | 5100 |
| Resistor **52** | do | 1100 |
| Resistors **60, 62, 64, 105** | do | 8200 |
| Resistors **66, 68, 70, 72, 74, 76, 118, 120, 122, 124, 126** and **128** | megohms | 0.11 |
| Resistor **110** | ohms | 5500 |
| Capacitors **130, 78, 80, 125, 142, 144** and **146** | micromicrofarads | 20 |
| Capacitors **82, 84**, and **136** | do | 5 |

Circuit values are given for the components of the first open ring circuit and lock-out stage only. The corresponding components of the other two open rings and the remaining lock-out stages have values corresponding to those given above.

It will be obvious that rings having more than the 9 stages illustrated in Fig. 3 may be constructed simply by adding additional open chains and lock-out stages similar to those shown, it being necessary only to properly proportion cathode resistor 110 associated with the lock-out stages to maintain the bias conditions set forth above so that the lock-out ring will operate in the required manner. It will be noted that it is not necessary that the individual chains all have the same number of stages. Thus the total number of stages may be a prime number if required.

What is claimed is:

1. A multistage ring circuit comprising a plurality of open ring circuits each of a relatively small number of stages and having interstage connections for transferring a condition of conduction from stage to stage, an auxiliary stage connected to the final stage of each of said open ring circuits and effective when actuated to connect the final stage of the open ring with which it is associated to the initial stage thereof to form a closed ring, and means interconnecting said auxiliary stages in a closed ring circuit.

2. A ring circuit of a relatively large number of stages comprising a plurality of open ring circuits each of a relatively small number of single tube stages and having interstage connections for transferring a condition of conduction from stage to stage, a control tube connected to the final stage of each of said open rings and effective when operated to close the open ring with which it is associated, and circuits connecting said control tubes as a separate ring circuit.

3. A ring circuit comprising a plurality of component open ring circuits each of a plurality of circuits having two different operating conditions interconnected to transfer a condition of conduction from one circuit to the next, an additional circuit having two operating conditions associated with each of said open rings and arranged in one of said conditions to close the open ring with which it is associated, and means for interconnecting said additional circuits to form a control ring circuit.

4. A multistage ring circuit comprising a plurality of chain circuits each having a relatively low number of single tube stages means interconnecting the tubes of all stages of said chain circuits and permitting conduction of only one stage at a time, and an auxiliary ring circuit arranged when the condition of conduction has reached the final stage of a chain to transfer said condition to the initial stage of another chain.

5. A multistage ring circuit comprising a plurality of chain circuits each of a relatively low number of stages, means for interconnecting all stages of all of said chains to permit only one stage at a time to conduct, and an auxiliary ring circuit having one stage associated with each chain, each of said stages being responsive to the operation of the last stage of the associated chain to cause the transfer of the condition of conduction to the first stage of another chain.

6. In a ring circuit wherein each stage comprises a single electron tube, a plurality of open ring circuits each of a relatively low number of single tube stages interconnected for the transfer of a condition of conduction from stage to stage, a control stage connected between two adjacent stages of each open ring and effective when actuated to close the ring with which it is associated, and interconnections between said control stages to form a closed ring circuit, the control stage associated with each open ring being activated only after the condition of conduction has traversed the stages of each of the other open rings in turn.

7. A multistage ring circuit comprising a plurality of chain circuits having a single tube per stage interconnected for transferring a condition of conduction from stage to stage in each chain, a transfer stage connected at the end of each of said chain circuits and having two operating conditions, said transfer stages being effective in one of said operating conditions to transfer the condition of conduction from the final stage of the chain to which it is connected to the transfer stage of another chain and being effective in the other condition to transfer the condition of conduction from another transfer stage to the initial stage of the chain with which it is associated, and connections between said transfer stages to prevent more than one of them from occupying said one operating condition at any one time.

8. A multistage ring circuit comprising a plurality of chain circuits each of a relatively small number of stages, a source of driving pulses, means for applying said pulses simultaneously to all stages of all of said chain circuits, circuits interconnecting the stages of each chain and responsive to the interruption of conduction in one stage to initiate conduction in the following stage in that chain, a lock-out tube associated with the final stage of each chain and responsive to the interruption in conduction of said final stage to initiate conduction in the first stage of another chain and interconnections between said lock-out stages to form a ring circuit wherein only one lock-out stage is operative at any time to transfer the condition of conduction.

9. A multistage ring circuit comprising a plurality of open ring circuits each of a relatively low number of stages, connections between all stages of all of said open rings permitting only one stage to conduct at a time, connections between the stages of each of said open rings effective upon interruption in conduction in one stage to initiate conduction in the following stage, a source of driving pulses connected to all of said stages and effective to interrupt conduction in the conducting stage, a control stage for each open ring having two stable operating conditions, each of said control stages being actuated upon interruption of conduction in the final stage of the open ring with which it is associated to interrupt conduction in the control stage of another open ring and being effective upon such interruption by another control stage to initiate conduction in the first stage of its associated open ring, said control stages being interconnected to prevent the interruption of conduction in more than one of said control stages at a time.

10. A multistage ring circuit comprising a plurality of open ring circuits each of a relatively small number of stages, each stage including a single tube having at least anode, cathode and control grid elements, resistors connected between the anode of each tube and the control grid of each other tube in the same open ring, a cathode resistor shared in common by all of said tubes, the anode-grid and cathode resistors being proportioned to permit conduction in only one of said tubes at a time, additional connections between the tubes of each open ring for transferring the condition of conduction from tube to tube, an auxiliary stage connected to the final stage of each open ring and effective when actuated to transfer the condition of conduction from the final stage of the open ring with which it is associated to the initial stage of another open ring, and means connecting said auxiliary stages in an open ring circuit.

11. A multistage ring circuit comprising a plurality of open ring circuits each of a relatively small number of stages, each stage including a single tube having at least anode, cathode and control grid elements, resistors connected between the anode of each tube and the control grid of each other tube in the same open ring, a cathode resistor shared in common by all of said tubes, the anode-grid and cathode resistors being proportioned to permit conduction in only one of said tubes at a time, additional connections between the tubes of each open ring for transferring the condition of conduction from tube to tube, a control stage for each open ring having two stable operating conditions, each of said control stages being made conductive upon interruption of conduction in the final stage of the open ring with which it is associated to actuate the control stage of another open ring and being responsive to actuation by another control stage to initiate conduction in the first stage of its associated ring, said control stages being interconnected to prevent actuation of more than one of said control stages at a time.

JAMES O. EDSON.

REFERENCES CITED

The following references are of record in the file of this patent:

UNITED STATES PATENTS

| Number | Name | Date |
|---|---|---|
| 2,369,662 | Deloraine et al. | Feb. 20, 1945 |